Nov. 10, 1959     G. E. HENNING     2,911,676
APPARATUS FOR EXTRUDING PLASTIC MATERIAL

Filed May 8, 1956

INVENTOR.
G. E. HENNING
BY
ATTORNEY

Nov. 10, 1959     G. E. HENNING     2,911,676
APPARATUS FOR EXTRUDING PLASTIC MATERIAL
Filed May 8, 1956     2 Sheets-Sheet 2

INVENTOR.
G. E. HENNING
BY
ATTORNEY

United States Patent Office 2,911,676
Patented Nov. 10, 1959

2,911,676

APPARATUS FOR EXTRUDING PLASTIC MATERIAL

George E. Henning, Baltimore, Md., assignor to Western Electric Company, Incorporated, New York, N.Y., a corporation of New York Application May 8, 1956, Serial No. 583,469

8 Claims. (Cl. 18—13)

This invention relates to apparatus for extruding plastic material, and particularly to apparatus for extruding organic plastic insulating and jacketing material upon continuously advancing cores.

In producing an extruded covering on a core, such as a filamentary conductor or the like, serious difficulties have been encountered in the past in maintaining the covering concentric with respect to the core. One of the principal causes of eccentricity is the presence of unbalanced flow conditions within the extrusion head of the extruder used to form the covering on the core. This problem of unbalanced flow conditions is inherent in a conventional extruder of the cross head type.

The extrusion head of a conventional extruder of the cross head type is provided with an extrusion passage that communicates with and extends transversely with respect to the discharge end of an extrusion cylinder in which a stock screw is positioned for forcing a plastic material in an extrudable condition into the extrusion passage. Usually, a core tube is located at one end of the transversely extending extrusion passage and a conductor to be insulated is advanced through a guide passage in the core tube into a die positioned at the other end thereof. The core tube serves to guide the conductor so that the latter tends to pass through the axial center of the die orifice.

Due to the unavoidable 90° bend, the length of the path traversed by the plastic material flowing through that portion of the cross head of the extrusion passage nearest to the stock screw is substantially shorter than that traversed by the material flowing through the portion diametrically opposite thereto. In addition, in some extruders of this type, the flow of the plastic material through the portion of the cross section of the extrusion passage nearest to the stock screw approximates that of a fluid flow bounded by a single plate whereas in the diametrically opposite portion of the cross section the flow approximates that of a fluid flow bounded by two parallel plates. Thus, friction losses in the portion of the extrusion passage nearest to the stock screw are appreciably lower than elsewhere in the same cross section.

As a result of the differences in the lengths of the paths traversed by the plastic material in various portions of the extrusion passage and the physical environment of their associated flows, there exist substantial differences in the consistency and the rate of flow of the plastic material throughout a cross section thereof entering the die orifice. The portion of the cross section nearest to the stock screw has the highest rate of flow and the more remote portion which is diametrically opposite thereto has the lowest rate of flow. The resultant unbalance in the flow of the plastic material gives rise to eccentricity in the tubular covering extruded upon the conductor.

Various methods and apparatus have been devised heretofore in an attempt to obtain balanced flow conditions in extruders to attain concentricity of the extruded covering of a finished insulated conductor. Such methods and apparatus have had varying degrees of success and often have required relatively expensive changes in the design of conventional extruding apparatus.

It is an object of this invention to provide new and improved apparatus for extruding plastic material.

Another object of this invention is to provide new and improved methods of and apparatus for extruding organic plastic insulating and jacketing material upon continuously advancing cores.

A device illustrating certain features of the invention may include an improvement in apparatus for extruding plastic material comprising an extrusion cylinder having an extrusion bore formed therein, an extrusion head mounted at the discharge end of the extrusion cylinder and provided with a cylindrical passage communicating with and extending transversely with respect to the extrusion bore, means for forcing a plastic material through the extrusion bore and into the passage, and an extrusion guide positioned at the exit end of the passage provided with a die orifice having a constricted forming throat. The improvement may include a flow restricting member positioned within the passage, and a baffle positioned between the flow restricting member and the forming throat of the die orifice for thoroughly diffusing the flow of plastic material leaving the flow restricting member so that the mass of plastic material entering the forming throat is substantially balanced.

A complete understanding of the invention may be obtained from the following detailed description of apparatus forming a specific embodiment thereof, when read in conjunction with the appended drawings in which.

Figure 1:
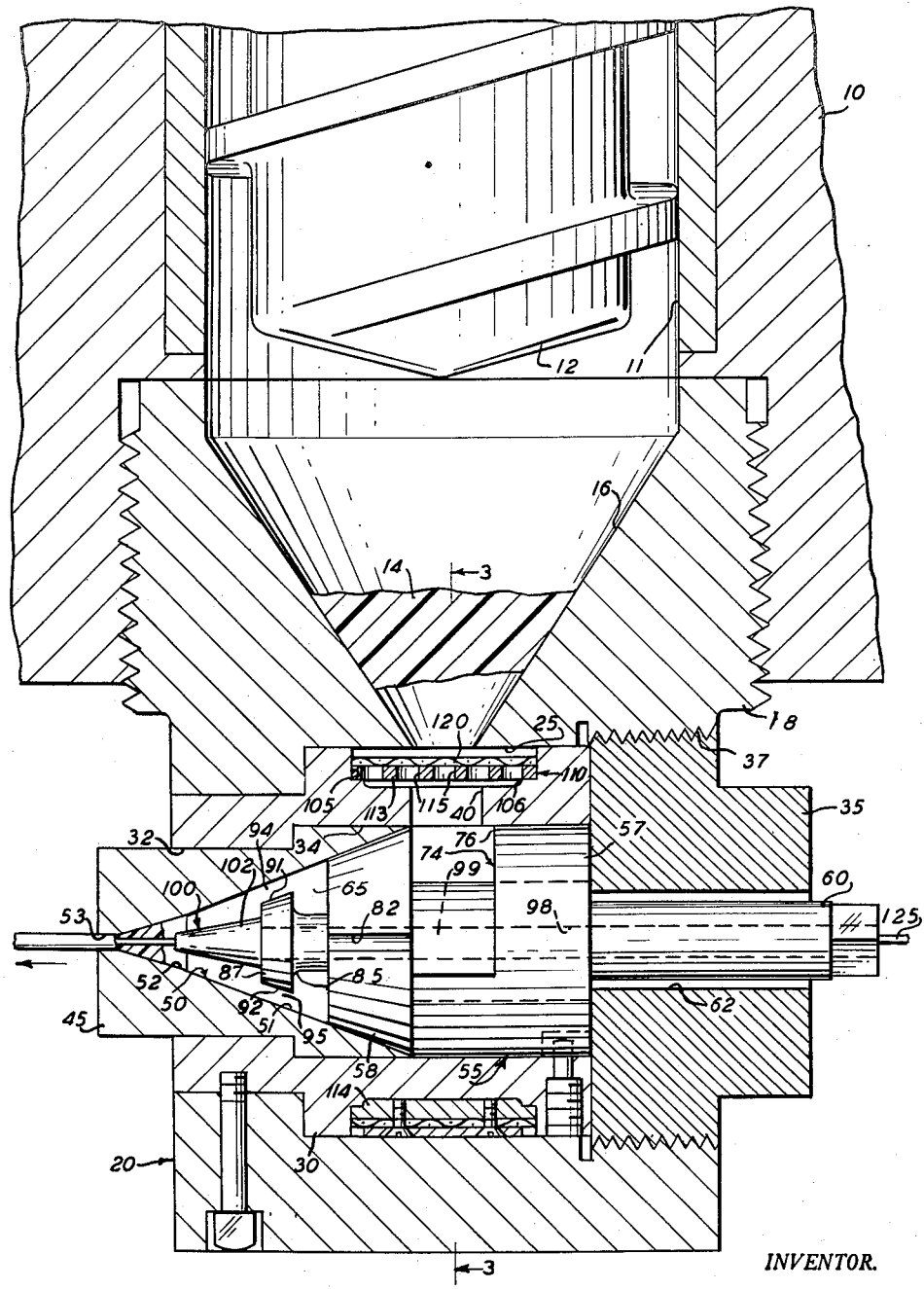
Fig. 1 is an enlarged, fragmentary horizontal section of an extrusion apparatus illustrating certain features of the invention.

Referring now in detail to the drawings, there is shown in Fig. 1, an extrusion cylinder 10 having formed therein an elongated, cylindrical extrusion bore 11 in which a stock screw 12 is mounted rotatably. The stock screw 12 is designed to be rotated by conventional drive means (not shown) for the purpose of working and forcing a plastic insulating material 14 along the extrusion bore 11 and into and through a tapered opening 16 in a body member 18 forming part of an extrusion head designated generally by the numeral 20. The extrusion head 20 is mounted detachably to the discharge end of the extrusion cylinder 10 so that the tapered opening 16 therein forms a continuation of the extrusion bore 11. The tapered opening 16 communicates with a bore 25 formed in the body member 18 transversely with respect to the longitudinal axis of the extrusion bore 11.

A generally cylindrical tool holder 30 having a cylindrical bore 32 and an enlarged cylindrical counterbore 34 formed coaxially therein, is mounted removably within the bore 25 in the body member 18 and is held in place by means of a threaded retainer nut 35. The retainer nut 35 is engaged threadedly within the complementary, threaded counterbore 37 formed in the body member 18. The tool holder 30 is provided with a feed port 40 extending radially from the outer periphery thereof to the counterbore 34, which is aligned with the discharge end of the tapered opening 16 on the longitudinal axis of the extrusion bore 11 so as to form a direct continuation thereof.

An extrusion die 45 is mounted closely within the left-hand end of the bore 32 and the counterbore 34, as viewed in Fig. 1, and is oriented so that the longitudinal axis of a die orifice designated generally by the numeral 50 formed therein is aligned on the common longitudinal axis of the bore 32 and the counterbore 34. The die orifice 50 is provided with an enlarged, frustoconical chamber portion 51 converging at a relatively large included angle, for example, about 45°. Adjoining the chamber portion 51 of the die orifice 50 is a frustoconical throat portion 52 which is relatively short compared to the chamber portion. For example, as shown in Fig. 1, the length of the entrance portion 51, measured along the longitudinal axis thereof, is about three times that of the throat portion 52 of the die orifice 50. The throat portion 52 converges at a relatively smaller included angle, for example, about 15°, and at its minimum diameter joins a relatively short, cylindrical land portion 53.

A core tube holder designated generally by the numeral 55 has a generally cylindrical body 57 and a frustoconical head 58. The body 57 of the core tube holder 55 fits closely within the counterbore 34 and the head 58, which converges at the same angle as the wall of the chamber portion 51 of the die orifice 50, is received closely within the entrance end of the chamber portion. The matching configurations of the head 58 and the chamber portion 51 serve to hold their associated parts in perfect self-alignment. In addition to securing the tool holder 30 in place, the retainer nut 35 also serves to retain the tube holder 55 in place within the tool holder with the head 58 held tightly within the entrance end of the chamber portion 51. A shank 60 of the core tube holder 55 extends rightwardly, as viewed in Fig. 1, to project through an aperture 62 formed in the retainer nut 35.

As shown in Fig. 1, the head 58 of the core tube holder 55 extends about one third the length of the chamber portion 51 forming a chamber 65 of relatively large volume. This length may be shortened appreciably if a greater volume is desired in the chamber 65.

The body 57 of the core tube holder 55 is provided with an arcuate channel designated generally by the numeral 74 formed in the periphery thereof. The channel 74 has two substantially identical channel legs 75 and 76 extending symmetrically circumferentially from a confluency at the discharge end of the feed port 40 to locations on opposite sides of the body 57. The distal ends of the channel legs 75 and 76 communicate with substantially identical, restricted grooves 81 and 82 (Fig. 3), respectively, which are formed symmetrically in the periphery of the head 58. The grooves 81 and 82 are positioned diametrically opposite each other on the head 58 and are equidistant from the feed port 40. The longitudinal axes of the grooves 81 and 82 and the longitudinal axis of the core tube holder 55 lie in a common plane transverse with respect to the longitudinal axis of the extrusion bore 11.

The grooves 81 and 82 are restricted only in the sense that the cross section of each is small enough to substantially eliminate any inequality in the flow of plastic material 14 across the cross section. Consistent with the latter objective the cross sections of the grooves should be as large as possible to reduce the resistance to the flow of plastic material 14.

Figure 2:
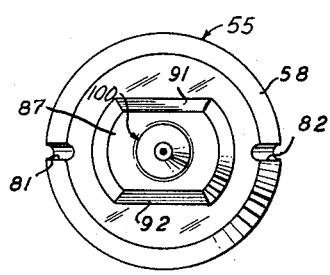
Fig. 2 is an enlarged, front view of a core tube holder, core tube and baffle forming part of the apparatus shown in Fig. 1.

Projecting from the forward face of the frustoconical head 58 of the core tube holder 55 and preferably formed integrally therewith is a relatively short, generally cylindrical nose 85 which terminates in an enlarged, generally frustoconical baffle 87. The nose 85 and the baffle 87 are positioned concentrically with respect to the die orifice 50. The periphery of the baffle 87 is relieved at diametrically opposite sides by two flat surfaces 91 and 92. The baffle 87 is otherwise designed to fit snugly within a complementary portion of the enlarged chamber portion 51. The relieved portions of the baffle 87 in effect form two passageways 94 and 95 on diametrically opposite sides of the baffle, through which passageways the plastic material 14 may flow to the throat portion 52 of the die orifice 50. The passageways 94 and 95 are preferably oriented at 90° with respect to the grooves 81 and 82 formed in the head 57, as shown in Fig. 2.

The core tube holder 55 is provided additionally with an axially extending bore 98 in which an elongated, cylindrical shank 99 of a core tube designated generally by the numeral 100 is mounted coaxially with respect to the die orifice 50. The core tube 100 has an elongated, frustoconical tip 102 which projects from the forward face of the baffle 87 to a point closely adjacent to the exit end of the chamber portion 51 of the die orifice 50. The frustoconical surface of the tip 102 is spaced from the wall of the die orifice 50 to permit the required flow of the plastic material 14 into the throat portion 52.

Figure 3:
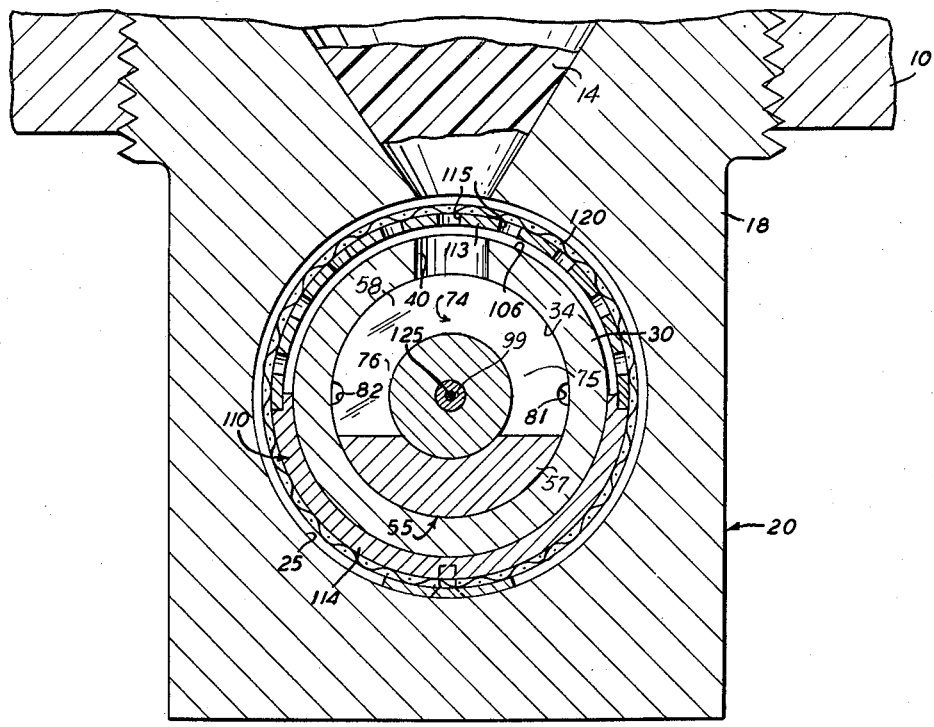
Fig. 3 is a fragmentary, vertical section taken along line 3—3 of Fig. 1.

As shown in Figs. 1 and 3 the periphery of the tool holder 30 is provided with a circumferentially extending recess 105, the bottom of which is relieved by a narrower recess 106. The recesses 105 and 106 are centered with respect to the common longitudinal axes of the feed port 40 and extrusion bore 11. A backing member designated generally by the numeral 110 is positioned within the recess 105 and is composed of two interlocking half sections 113 and 114. The upper half section 113 is provided with a multiplicity of radially extending perforations 115—115 through which the plastic compound 14 enters the feed port 40 from the tapered opening 16. The backing member 110 is designed to support an annular, composite screen pack 120 made up of several annular layers of conventional wire screening of various meshes.

*Operation*

In the operation of the extrusion apparatus hereinabove described, a filamentary conductor 125 is continuously advanced longitudinally through the core tube 100 at a predetermined linear speed in the direction of the arrow shown in Fig. 1. At the same time a suitable plastic insulating material 14, such as polyethylene or the like, is advanced by the rotatably driven stock screw 12, in an extrudable condition, through the extrusion bore 11 and into the tapered opening 16 of the extrusion head 20.

Upon emerging from the discharge end of the tapered opening 16 the plastic material 14 flows through the screen pack 120 and the perforations 115—115 in the backing member 110 into the feed port 40. Initially the flow of plastic material 14 will be through those perforations 115—115 immediately adjacent to the feed port 40, but as the screening of the screen pack 120 becomes clogged during prolonged operation, the plastic material 14 will flow circumferentially to either side within the recess 105 and through the other perforations into the recess 106 from whence it flows through the feed port 40. This feature of the design of the backing member 113 permits prolonged operation of the extrusion apparatus without shutting down to clean or replace the screen pack 120. As the screen pack 120 becomes clogged there is substantially no change in the balanced flow pattern of the plastic material across a transverse cross section of the feed port 40.

Upon emerging from the feed port 40 the plastic material splits into two separate, equal streams which flow circumferentially in opposite directions along the channel legs 75 and 76 to diametrically opposite points on the core tube holder 55. The plastic material 14 enters the grooves 81 and 82, the entrance ends of which are equidistant from the feed port 40 so that the paths traversed by the separate streams of the plastic material are identical. The two separate streams of the plastic material emerge from the grooves 81 and 82 at a relatively high velocity and enter the chamber 65 at diametrically opposite points and within the chamber the streams are recombined and the relatively high velocity thereof is converted into a relatively high static pressure. The chamber 65, because of its relatively large volume tends to damp out turbulence due to the relatively high velocity of motion of the two entering streams of plastic material 14.

The angular orientation of the passageways 94 and 95 formed by the baffle 87 causes the flow of plastic material to be thoroughly diffused and in this way further tends to promote uniformity in the flow of the plastic material 14 throughout a cross section of the throat portion 52 of the die orifice 50. As a result the flow of the plastic material 14 through a transverse cross section of the throat portion is substantially balanced and a substantially concentric covering is applied to the continuously advancing conductor 125.

The elongated tip 102 of the core tube 100 shields the advancing conductor 125 until immediately before it enters the throat portion 52 of the die orifice 50. This shielding is very important when the conductor is fragile and connot withstand a substantial amount of drag imposed by the plastic material 14 thereon. Since the drag on the conductor 125 is proportional to the length of the exposed conductor, the shielding afforded by the core tube tip 102 reduces the drag on the conductor.

It will be understood that the term "plastic insulating material" as employed in the specification and appended claims is meant to include thermoplastic material such as polyethylene, polyvinyl compound or the like, and also thermosetting material such as rubber compounds, Neoprene compounds or the like. It will be understood that the above-described embodiment is merely illustrative of the principles of the invention and that various modifications and embodiments of the invention may be made within the spirit and scope thereof.

What is claimed is:

1. In apparatus for extruding plastic material including an extrusion cylinder having an extrusion bore formed therein, an extrusion head mounted at the discharge end of the extrusion cylinder and provided with a passage communicating with and extending transversely with respect to the extrusion bore, means for forcing a plastic material through the extrusion bore and into the passage and an extrusion die positioned at the exit end of the passage and provided with a die orifice having a constricted forming throat, the improvement which comprises means positioned within the passage and provided with a pair of substantially identical, diametrically opposite, restricted passageways through which the plastic material flows as two equal streams, and a baffle provided with a plurality of relieved portions of substantially larger cross-sectional area than the restricted passageways and orienting angularly with respect thereto, said baffle being positioned between the restricted passageways and the forming throat of the die orifice for breaking up and slowing down the streams and thus thoroughly diffusing the combined flow of plastic material from the restricted passageways, whereby the mass of plastic material entering the throat is substantially balanced throughout a cross section.

2. In apparatus for extruding plastic material including an extrusion cylinder having an extrusion bore formed therein, an extrusion head mounted at the discharge end of the extrusion cylinder and provided with a cylindrical passage communicating with and extending transversely with respect to the extrusion bore, means for forcing a plastic material through the extrusion bore and into the passage and an extrusion die positioned at the exit end of the passage and provided with a die orifice having a constricted forming throat, the improvement which comprises a core tube holder positioned within the passage and provided with a frustoconical head fitting closely within the entrance end of a frustoconical chamber of relatively large volume formed in the extrusion die adjoining the forming throat, the frustoconical head having a pair of substantially identical restricted grooves formed in its periphery at diametrically opposite sides, equidistantly from the discharge end of the extrusion bore in a plane transverse to the longitudinal axis of the extrusion bore and communicating between the extrusion bore and the chamber of the die orifice, a frustoconical baffle fitting closely within the chamber near the exit end thereof, a neck of reduced cross section connecting the baffle to the head of the core tube holder in spaced relation thereto, the frustoconical periphery of the baffle being relieved at diametrically opposite sides to provide two substantially identical passageways offset from the grooves at ninety degree angles with respect thereto, the relieved portions of the baffle are substantially larger than the restricted grooves on the core tube holder for decreasing the velocity of the plastic material flowing therethrough with respect to the flow of the plastic through the restricted grooves.

3. In apparatus for extruding plastic material including an extrusion cylinder having an extrusion bore formed therein, an extrusion head mounted at the discharge end of the extrusion cylinder and provided with a cylindrical passage communicating with and extending transversely with respect to the extrusion bore, means for forcing a plastic material through the extrusion bore and into the passage and an extrusion die positioned at the exit end of the passage and provided with a die orifice having a constricted forming throat, the improvement which comprises a core tube holder positioned within the passage and provided with a frustoconical head fitting closely within the entrance end of a frustoconical chamber of relatively large volume formed in the extrusion die adjoining the forming throat, the frustoconical head having a pair of substantially identical restricted grooves formed in its periphery at diametrically opposite sides, positioned equidistantly from the discharge end of the extrusion bore in a plane transverse to the longitudinal axis thereof and communicating between the extrusion bore and the chamber of the die orifice, a frustoconical baffle fitting closely within the chamber near the exit end thereof for slowing down the flow of plastic to the extrusion die, a neck of reduced cross section connecting the baffle to the head of the core tube holder in spaced relation thereto, the frustoconical periphery of the baffle being relieved at diametrically opposite sides to provide two substantially identical passageways through which the plastic material may enter the throat of the die orifice, said passageways being offset at equal angles with respect to the grooves in the head of the core tube and being of larger cross-sectional area than the grooves so that the rate of flow of plastic therethrough will be substantially less than the rate of flow through the grooves, and a core tube positioned concentrically with respect to the passage within an axially extending bore formed in the baffle, the neck and the core tube holder and having a frustoconical nose extending from the baffle into the entrance of the throat.

4. In apparatus for extruding plastic material including an extrusion cylinder having an extrusion bore formed therein, an extrusion head mounted at the discharge end of the extrusion cylinder and provided with a cylindrical passage communicating with and extending transversely with respect to the extrusion bore and means for forcing a plastic material along the extrusion bore and into the passage, the improvement which comprises an extrusion die positioned at one end of the passage and provided with an axially extending die orifice concentric with respect to the passage and having an enlarged frustoconical chamber and an adjoining constricted forming throat, a core tube holder mounted within the passage and provided with a frustoconical head extending partly into and closing the entrance of the chamber portion except for two substantially identical restricted passageways formed in the frustoconical head and positioned at points diametrically opposite each other and equidistant from the discharge end of the extrusion bore, means for dividing the plastic material entering the passage from the extrusion bore into two substantially identical streams and for directing said streams to the restricted passageways, a baffle member projecting from the head of the core tube holder and having a plurality of relieved portions through which the plastic material flows which are of substantially larger cross-sectional area than the restricted passageways, spaced angularly equal distances from the restricted passageways and so positioned within the chamber as to effect a slowing down of the streams and a thorough diffusion of the combined flow of plastic material through the chamber, and means for guiding a filamentary core axially through the core tube holder and baffle.

5. In apparatus for extruding plastic material including an extrusion cylinder having an extrusion bore formed therein, an extrusion head mounted at the discharge end of the extrusion cylinder and provided with a cylindrical passage communicating with and extending transversely with respect to the extrusion bore and means for forcing a plastic material from the extrusion bore into the passage, the improvement which comprises a tubular tool holder fitting closely within the passage and having a circumferentially extending recess formed in its outer periphery in communication with the extrusion bore and a radially extending feed port aligned with the longitudinal axis of the extrusion bore and extending from the recess to the interior of the tool holder, the bottom of the recess being relieved by a channel communicating with the feed port and extending circumferentially of the tool holder symmetrically about the feed port, a screen positioned within the recess and covering the channel and the feed port so that the plastic material entering the recess from the extrusion bore flows radially through the screen into the channel and the feed port, an extrusion die mounted within the tool holder at the exit end of the passage and provided with a die orifice having a constricted forming throat and an adjoining frustoconical chamber of a relatively large volume, a core tube holder having a frustoconical head fitting closely within the entrance of the chamber and provided with a pair of substantially identical restricted grooves at diametrically opposite sides thereof, the entrance ends of said grooves being equidistant from and communicating with the feed port, means for dividing the plastic material emerging from the feed port into two equal streams and for directing said streams through the grooves and into the chamber portion, and a baffle positioned within the chamber and spaced from the head of the core tube holder.

6. In apparatus for extruding plastic material including an extrusion cylinder having an extrusion bore formed therein, an extrusion head mounted at the discharge end of the extrusion cylinder and provided with a cylindrical passage communicating with and extending transversely with respect to the extrusion bore and means for forcing a plastic material along the extrusion bore and into the passage, the improvement which comprises a tubular tool holder fitting closely within the passage and having a circumferentially extending recess formed in its outer periphery in communication with the discharge end of the extrusion bore and a radially extending feed port aligned with the longitudinal axis of the extrusion bore and leading the recess to the interior of the tool holder, the bottom of the recess being relieved by a channel communicating with the feed port and extending circumferentially of the tool holder symmetrically about the feed port, and a screen positioned within the recess and covering the channel and the feed port so that the plastic material entering the recess from the extrusion bore flows radially through the screen to enter the channel and the feed port.

7. In apparatus for extruding plastic material including an extrusion cylinder having an extrusion bore formed therein, an extrusion head mounted at the discharge end of the extrusion cylinder and provided with a cylindrical passage communicating with and extending transversely with respect to the extrusion bore and means for forcing a plastic material along the extrusion bore and into the passage, the improvement which comprises a tubular tool holder fitting closely within the passage and having a circumferentially extending recess formed in its outer periphery in communication with the discharge end of the extrusion bore and a radially extending feed port aligned with the longitudinal axis of the extrusion bore and leading the recess to the interior of the tool holder, the bottom of the recess being relieved by a channel communicating with the feed port and extending circumferentially of the tool holder symmetrically about the feed port, an annular backing member positioned within the recess and covering the channel and the feed port, said backing member having a plurality of perforations formed therein, and a screen mounted on the backing member, the plastic material entering the recess from the extrusion bore flowing radially through the screen and the perforations to enter the channel and the feed port.

8. In apparatus for extruding plastic material including an extrusion cylinder having an extrusion bore formed therein, an extrusion head mounted at the discharge end of the extrusion cylinder and provided with a cylindrical passage communicating with and extending transversely with respect to the extrusion bore and means for forcing a plastic material along the extrusion bore and into the passage, the improvement which comprises a tubular tool holder fitting closely within the passage and having a circumferentially extending recess formed in its outer periphery in communication with the discharge end of the extrusion bore and a radially extending feed port aligned with the longitudinal axis of the extrusion bore and leading the recess to the interior of the tool holder, the bottom of the recess being relieved by a channel communicating with the feed port and extending circumferentially of the tool holder symmetrically about the feed port, an annular composite backing member composed of two interlocking semicircular segments positioned within the recess, one of said segments having formed therein a multiplicity of radially extending perforations and being designed to fit over the channel and the feed port, and a screen member mounted in the recess and supported by the backing member whereby the plastic material entering the recess from the extrusion bore flows radially through the screen and the perforations to enter the channel and the feed port.

References Cited in the file of this patent

UNITED STATES PATENTS

| | | |
|---|---|---|
| 1,595,470 | Johnson | Aug. 10, 1926 |
| 2,560,778 | Richardson et al. | July 17, 1951 |
| 2,593,136 | Gliss | Apr. 15, 1952 |
| 2,750,627 | Gray | June 19, 1956 |

FOREIGN PATENTS

| | | |
|---|---|---|
| 624,699 | Great Britain | June 15, 1949 |
| 458,747 | Italy | July 28, 1950 |
| 649,873 | Great Britain | Feb. 7, 1951 |
| 912,113 | Germany | Apr. 15, 1954 |